Sept. 15, 1936.　　　D. B. TOZZI　　　2,054,455
LIFTING APPARATUS FOR MOTOR VEHICLES
Filed Nov. 4, 1930
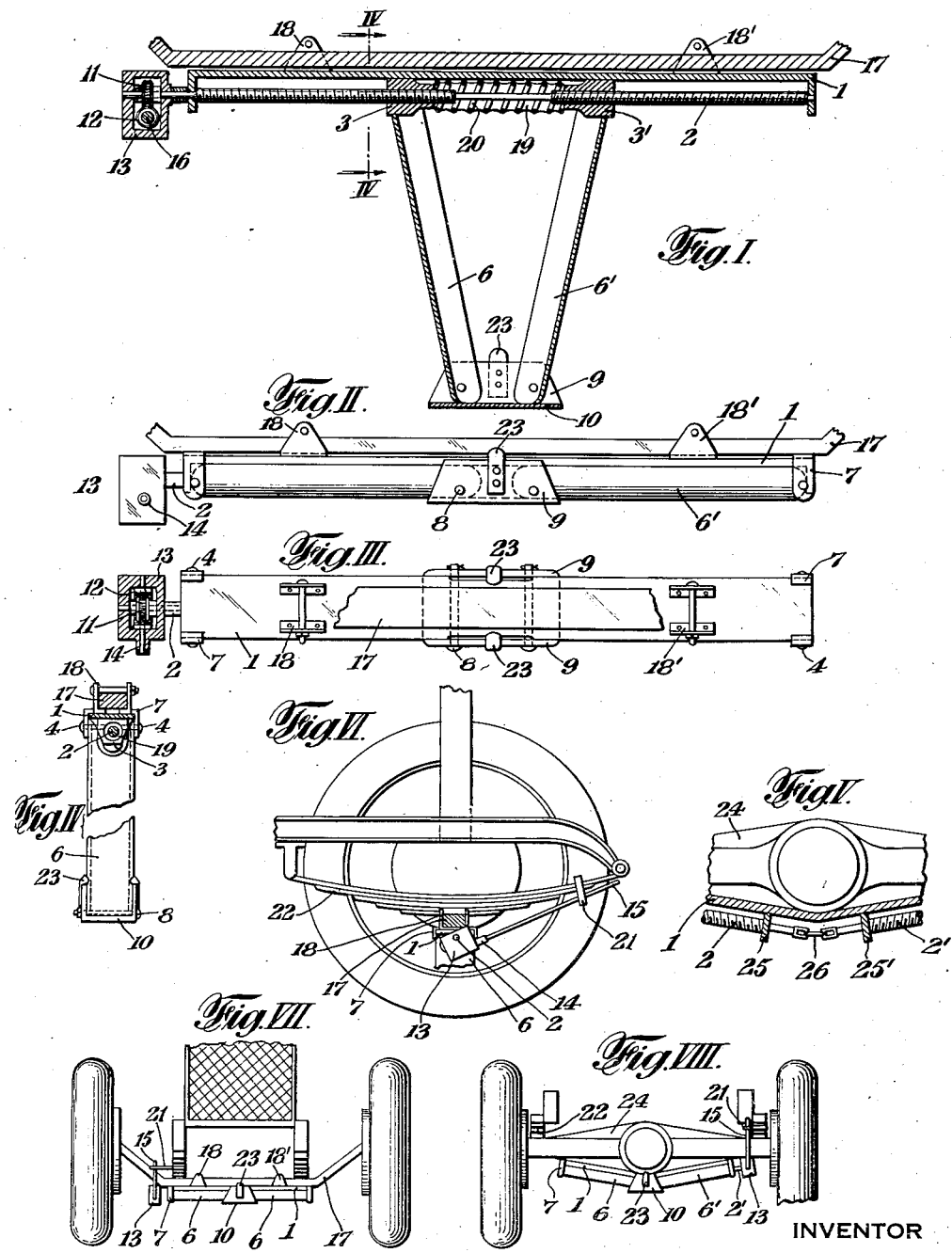
INVENTOR
DELFINA BARBETTA TOZZI
BY her ATTORNEY Patented Sept. 15, 1936

2,054,455

UNITED STATES PATENT OFFICE 2,054,455

LIFTING APPARATUS FOR MOTOR VEHICLES

Delfina Barbetta Tozzi, Rivoli, near Turin, Italy, assignor to Anthony Russo, New York, N. Y.

Application November 4, 1930, Serial No. 493,325
In Italy November 28, 1929

13 Claims. (Cl. 254—126)

Generally, the invention relates to manually operable lifting apparatus for heavy loads, and more particularly to a type of lifting apparatus for motor vehicles that is affixed to and carried by the axles thereof, the apparatus thereafter requiring solely the use of the ordinary spanner in order to be set into operative position.

A broad object of the invention is to provide an improved lifting apparatus structure or automobile-jack of the character described, such that when needed for the usual reasons the engagement and manual operation of any suitable spanner with a spindle element of the said structure are the only acts requisite for the action thereof, no other preparatory operation being necessary.

Another object of the invention is to provide a structure wherein simplicity of operation, lightness in weight, practicability, and sturdiness are obvious features. A further object of the invention is the provision of a structure wherein only a minimum number of parts are involved, these said parts being economical to manufacture, and easy to assemble.

These objects and other advantageous ends and features attendant upon the structure, arrangement and combination of parts to which the invention relates will incidentally appear in the following description wherein reference is made to the accompanying drawing in which like reference characters designate corresponding parts throughout the several views.

Fig. I is an elevation in section of a preferred embodiment of the invention in its operative position.

Fig. II is a front elevation of the said preferred embodiment of the invention in its inoperative position.

Fig. III is a corresponding plan view of Fig. II.

Fig. IV is a cross section along the plane of line IV—IV of Fig. I.

Fig. V is a partial view in elevation of a preferred embodiment of the invention as modified and adapted for attachment to the rear axle of a motor vehicle.

Fig. VI is an end view in elevation showing the operating means of the preferred embodiment of the invention as fitted to the front axle of a motor vehicle.

Figs. VII and VIII are elevations showing the lifting apparatus in inoperative position but fitted to the front and rear axle respectively of a motor vehicle.

The preferred embodiment of the invention comprises a plate 1 the ends of which are bent downwardly and at right angles and a screw 2, the thread of which is right handed on one half and left handed on the other half. Two nuts 3 and 3', each of which consists of a metallic block provided with a threaded hole and abutting with its upper machined part against the under surface of plate 1 so as not to rotate about its own axis, engage with the two screw portions of screw 2. The said screw 2 has its axis parallel to the plate 1 and is rotatably mounted between the two bent ends of plate 1 as best illustrated in Fig. I of the accompanying drawing.

Each nut 3 and 3' on the front and rear sides is provided with projecting pins 4 to which are articulated the respective ends of the lifting arms 6 and 6'. Pins 4 are coupled at their outer ends with plates 7, the upper part of each of the said plates being perpendicularly bent to grip and slide along the edges of the upper surface of plate 1. A purpose of the use of plates 7 resides in the partial distribution of the depending weight from screw 2 to plate 1.

The free ends of the lifting arms 6 and 6' are articulated by means of pins 8 mounted between the front and rear walls 9 of the base plate 10. Base plate 10 rests on the ground when the apparatus is in use as illustrated in Fig. I of the accompanying drawing.

Keyed to one of the ends of screw 2 is a pinion or preferably a worm gear 11 meshing with a worm or shaft 12 on which a spiral is formed, pinion 11 and worm shaft 12 both being enclosed in a metallic casing 13, the said casing in conjunction with pinion 11 and worm shaft 12 being capable of rotating screw 2. I wish it understood that although a worm gear and a worm shaft are represented as being the means of communicating motion to screw 2, a pair of meshed bevel gears may be substituted therefor without in any way affecting the scope of the invention.

14 is a tube projecting from casing 13 and communicates with the bore of the worm shaft 12. 15 is a spindle passing through tube 14 and secured to the worm shaft 12 by any means such as the engagement of a split end of spindle 15 with a cross pin 16 in the bore of worm shaft 12. The last-mentioned engagement or security of spindle 15 to the worm shaft 12 is not shown in the accompanying drawing, the same being deemed both manifest and unnecessary.

Plate 1 is secured under the forward axle 17 of any motor vehicle by means of two sets of ears 18 and 18' with nuts and bolts joining the ears of each set, the said ears being affixed to the upper face of plate 1 and suitably spaced from the downwardly bent ends of the said plate. Ears 18 and 18', as noted from Fig. III of the accompanying drawing, project from within the upper edges of plate 1 to allow enough clearance for the movement of the bent portions of plates 7.

Screw 2 is protected from mud and other extraneous matter by a sheath of leather or other suitable flexible material 19 and is centered on screw 2 by means of a spiral wire 20. The ends of the sheath 19 as well as the spiral wire are affixed to the nuts 3 and 3'.

Spindle 15, projecting from the casing 13 through tube 14 has its free end so shaped that it may be rotated by means of a suitable spanner, and is supported and guided by any adaptable stirrup 21 secured preferably to any of the semi-elliptical springs 22, as shown in Fig. VI of the accompanying drawing.

In the inoperative position of the embodiment of the invention as shown in Fig. II, the nuts 3 and 3' are at the opposite ends of the screw 2 and abut against the bent ends of plate 1, while both lifting arms 6 and 6' are in a horizontal position and the walls 9 of base plate 10 contact with plate 1. The upper edges of plate 1 adjoining the walls 9, when the structure is in inoperative position, are bevelled to permit the latching of base plate 10 with plate 1 by means of semispherical shells 23 projecting off plates affixed to the outside of walls 9. Such a latching feature prevents the lifting apparatus from rattling when the motor vehicle to which it is affixed is in motion. Fig. II of the accompanying drawing best illustrates the aforedescribed latching arrangement.

By reason of the support given screw 2 by the bent portions of plates 7, the bent end of plate 1 away from casing 13 may be eliminated if so desired.

When it is desired to use the lifting apparatus, spindle 15 is rotated by means of a suitable spanner. The screw 2 will be set in rotation through worm or gear 12 and gear 11, and, its two halves being threaded in opposite directions, the two nuts 3 and 3' will be brought close to each other forcing the lifting arms 6 and 6' into a downwardly inclined position as shown in Fig. I until the base plate 10 reaching the ground will lift the vehicle.

The arrangement of the threaded halves of screw 2, it is to be remembered, should be such that the nuts 3 and 3' will be brought together when spindle 15 is rotated to the right, simply to conform with usage and habit of the operator of the lifting apparatus.

For affixation of the lifting apparatus under the rear axle 24, plate 1 as shown in Fig. V is bent to conform to the shape of the axle. In this case the screw is divided into two parts 2 and 2', each being parallel to the corresponding parts of plate 1, while projections 25 and 25' and the bent ends of plate 1 serve as supports for the rotatable mounting of the screw portions. Although not shown in the accompanying drawing, sheath 19 and spiral wire 20 are correspondingly changed in location to conform to the instant modification of the apparatus for the rear axle, while the elements of attachment of plate 1 to the rear axle are conformably changed from the structure of ears 18 and 18' joined by nuts and bolts. The two parts of screw 2, namely 2 and 2' are connected to each other by a series of links 26 in order to induce operation of screw 2 on the principle of the Cardan joint.

I wish it understood that the embodiment of the invention heretofore described is solely for purposes of disclosure, there being reserved the right of mechanical adaptation to the front and rear axles of any motor vehicle. Furthermore, it is understood that minor changes in size, shape and arrangement of parts together with variations and modifications of details may all be resorted to without departing from the spirit of the invention nor enlarging its scope within the appended claims.

Having described my invention, what I now claim as new and desire to secure by Letters Patent of the United States is:

1. A lifting apparatus for motor vehicles comprising a longitudinal plate member adapted to be affixed along the underside of the axle, a screw with right hand and left hand threads mounted therebeneath and parallel to the said axle, nuts on said screw-threaded portions, arms pivoted on said nuts and a supporting plate articulated to the other end of said arms, the said arms and said supporting plate when finally folded being in alignment and constructed to form a compact casing with the longitudinal plate member and latching means on said supporting plate cooperating with the longitudinal plate member to form a locking sleeve for the apparatus when the same is in inoperative position.

2. A lifting apparatus for motor vehicles comprising a longitudinal plate member adapted to be affixed along the underside of the axle, a screw with right hand and left hand threads mounted therebeneath and parallel to the said axle, nuts on said screw-threaded portions, arms pivoted on said nuts, a supporting plate articulated to the other end of said arms, the said arms and said supporting plate in final folded position being in alignment and constructed to form a compact casing with the longitudinal plate member, and latching means on said supporting plate cooperating with the longitudinal plate member to frictionally lock the supporting plate and the arm members when in final folded and aligned position to the longitudinal plate member.

3. A lifting apparatus for motor vehicles comprising a longitudinal plate member adapted to be affixed along the underside of the axle, a screw with right hand and left hand threads mounted therebeneath and parallel to the said axle, nuts on said screw-threaded portions, arms pivoted on said nuts, a supporting plate articulated to the other end of said arms, the said arms and said supporting plate in final folded position being in alignment and constructed to form a compact casing with the longitudinal plate member, latching means on said supporting plate cooperating with the longitudinal plate member to frictionally lock the supporting plate and the arm members when in final folded and aligned position to the longitudinal plate member, a spindle adapted to be fixed to the vehicle frame transverse to the axle direction and to be hand-actuated for rotating said screw and a gear mechanism and housing connecting said spindle with an end of said screw, said gear mechanism and housing permitting the oscillation of said spindle about the screw axis.

4. A lifting apparatus for motor vehicles comprising a longitudinal plate member adapted to be affixed along the underside of the axle, a screw with right hand and left hand threads mounted therebeneath and parallel to the said axle, nuts on said screw threaded portions, arms pivoted on said nuts, a supporting plate articulated to the other end of said arms, the said arms and said supporting plate in final folded position being in alignment and constructed to form a compact casing with the longitudinal plate member, stop tongues positioned on the said supporting plate and corresponding seats on the longitudinal plate member into which the said tongues are adapted to snap for frictionally locking the aligned arm members and supporting plate when in final folded and aligned position.

5. A lifting apparatus for motor vehicles comprising a longitudinal plate member adapted to be affixed along the underside of the axle, a screw with right hand and left hand threads mounted therebeneath and parallel to the said axle, nuts on said screw-threaded portions, arms pivoted on said nuts, a supporting plate articulated to the other end of said arms, the said arms and said supporting plate in final folded position being in alignment and constructed to form a compact casing with the longitudinal plate member, a spindle adapted to be fixed to the vehicle frame transverse to the axle direction and to be hand-actuated for rotating said screw, a gear mechanism and housing connecting said spindle with an end of said screw, said gear mechanism and housing permitting the oscillation of said spindle about the screw axis, stop tongues positioned on the said supporting plate and corresponding seats on the longitudinal plate member into which the said tongues are adapted to snap for frictionally locking the aligned arm members and supporting plate when in final folded and aligned position.

6. A lifting apparatus for motor vehicles comprising a plate member adapted to be affixed along the underside of the axle, a screw made up of two portions with opposite screw threads and connected together by a Cardan joint, the said screw being mounted therebeneath and parallel to the underside of the said axle, nuts on said screw-threaded portions, arms pivoted on said nuts and a supporting plate articulated to the other end of said arms, the said arms and said supporting plate in final folded position being in alignment with the plate member and forming therewith a compact casing and latching means on said supporting plate cooperating with the longitudinal plate member to form a frictionally operated locking sleeve for the apparatus when the same is in inoperative position.

7. A lifting apparatus for motor vehicles comprising a plate member adapted to be affixed along the underside of the axle, a screw made up of two portions with opposite screw threads and connected together by a Cardan joint, the said screw being mounted therebeneath and parallel to the underside of the said axle, nuts on said screw-threaded portions, arms pivoted on said nuts and a supporting plate articulated to the other end of said arms, the said arms and said supporting plate in final folded position being in alignment with the plate member and forming therewith a compact casing, and latching means on said supporting plate to frictionally lock the same and the arm members when in final folded and aligned position to the said plate member.

8. A lifting apparatus for motor vehicles comprising a plate member adapted to be affixed along the underside of the axle, a screw made up of two portions with opposite screw threads and connected together by a Cardan joint, the said screw being mounted therebeneath and parallel to the underside of the said axle, nuts on said screw threaded portions, arms pivoted on said nuts and a supporting plate articulated to the other end of said arms, the said arms and said supporting plate in final folded position being in alignment with the plate member and forming therewith a compact casing, and stop tongues positioned on the said supporting plate and corresponding seats on the plate member into which the said tongues are adapted to snap for frictionally locking the aligned arm members and supporting plate when in final folded and aligned position.

9. A lifting apparatus for motor vehicles comprising a plate member adapted to be affixed along the underside of the axle, a screw made up of two portions with opposite screw threads and connected together by a Cardan joint, the said screw being mounted therebeneath and parallel to the underside of the said axle, nuts on said screw-threaded portions, arms pivoted on said nuts and a supporting plate articulated to the other end of said arms, the said arms and said supporting plate in final folded position being in alignment with the plate member and forming therewith a compact casing, latching means on said supporting plate to resiliently lock the same and the arm members when in final folded and aligned position to the said plate member, a spindle adapted to be fixed to the vehicle frame transverse to the axle direction and to be hand-actuated for rotating said screw, and a gear mechanism and housing connecting said spindle with an end of said screw, said gear mechanism and housing permitting the oscillation of said spindle about the screw axis.

10. In a lifting apparatus for motor vehicles having a rotatable screw with the halves thereof threaded in opposite directions and wherein each half of said screw is provided with a nut, the combination of a longitudinal plate adapted to be affixed along the underside of the axle and having end members on which the said screw is mounted, arm members each pivotally engaging at one end one of the said nuts, a substantially short and movable base member pivotally engaging the arm members at their opposite ends, the base member and arm members when in final folded position being in alignment and constructed and adapted to form a compact and light casing with the longitudinal plate member and latching means on said supporting plate cooperating with the longitudinal plate member to form a frictionally operated locking sleeve for the apparatus when the same is in inoperative position.

11. In a lifting apparatus for motor vehicles having a rotatable screw with the halves thereof threaded in opposite direction and wherein each half of said screw is provided with a nut, the combination of a longitudinal plate adapted to be affixed along the underside of the axle and having end members on which the said screw is mounted, arm members each pivotally engaging at one end one of the said nuts, a substantially short and movable base member pivotally engaging the arm members at their opposite ends, the base member and arm members when in final folded position being in alignment and constructed and adapted to form a compact and light casing with the longitudinal plate member, and latching means on the said base plate adapted to resiliently lock the said base plate and the arm members to the longitudinal plate when in final folded position.

12. A jack for permanent installation on a vehicle axle comprising a bracket having downwardly extending bearings at the ends, a feed screw journaled in said bearings and having right and left threads thereon, means for securing the bracket to the axle, means for rotating the feed screw, nuts on the threaded portions of the feed screw, guides carried by the nuts embracing the bracket and preventing rotation of the nuts on their axes, a supporting shoe, complementary levers pivoted to the nuts and to the shoe for raising and lowering the shoe when the nuts are moved outwardly or inwardly along the bracket by rotation of the feed screw, and resilient means carried by the shoe for clamping the shoe against the bracket in raised position.

13. A jack for permanent installation on a vehicle axle comprising a bracket, means for securing the bracket to the underneath face of the axle, said bracket having downwardly extending bearings at the ends, a feed screw journaled in said bearings having right and left threads, nuts nonrotatably mounted on said feed screw, a channel iron supporting shoe, complementary levers pivoted at the upper ends to said nuts and pivoted at the lower ends to the legs of said shoe on opposite sides of the center of said shoe for raising and lowering the shoe when the nuts are fed outwardly or inwardly upon the feed screw, and a resilient spring leaf catch secured to one of the legs of the shoe and having an offset portion adapted to spring over the top face of the bracket and clamp the shoe to the bracket in raised position.

DELFINA BARBETTA TOZZI.